United States Patent
Hadar

(10) Patent No.: US 6,796,083 B2
(45) Date of Patent: Sep. 28, 2004

(54) BARRIER, ENCLOSURE AND METHOD FOR PROTECTING CROPS INCLUDING A LIGHT REFLECTING SCREEN

(75) Inventor: Dror Hadar, Merkaz (IL)

(73) Assignee: BiotechNet Ltd., Tel Aviv (IL)

( * ) Notice: Subject to any disclaimer, the term of this patent is extended or adjusted under 35 U.S.C. 154(b) by 0 days.

(21) Appl. No.: 10/310,025

(22) Filed: Dec. 5, 2002

(65) Prior Publication Data

US 2004/0016176 A1 Jan. 29, 2004

Related U.S. Application Data

(60) Provisional application No. 60/398,130, filed on Jul. 25, 2002.

(51) Int. Cl.[7] .............................................. A01G 13/02
(52) U.S. Cl. ......................................................... 47/31
(58) Field of Search ................................... 47/31, 32.3

(56) References Cited

U.S. PATENT DOCUMENTS

| | | | | |
|---|---|---|---|---|
| 4,644,684 A | * | 2/1987 | Verbeeck | 47/31 |
| 4,730,633 A | * | 3/1988 | Greenbaum | 135/93 |
| 4,798,023 A | * | 1/1989 | Morssinkhof et al. | 47/32 |
| 5,022,181 A | * | 6/1991 | Longstaff | 47/31 |
| 6,052,943 A | | 4/2000 | Hoffmann et al. | |
| 6,197,141 B1 | * | 3/2001 | Madsen | 156/167 |
| 6,284,383 B1 | * | 9/2001 | Nishiyama | 428/430 |
| 6,341,444 B1 | | 1/2002 | Cina et al. | |

FOREIGN PATENT DOCUMENTS

| | | | | |
|---|---|---|---|---|
| EP | 80961 A1 | * | 6/1983 | ............ A01G/9/22 |
| JP | 04133731 A | * | 5/1992 | ........... B32B/15/08 |
| JP | 07123875 A | * | 5/1995 | ........... A01G/13/02 |
| JP | 409107815 A | * | 4/1997 | ........... A01G/13/02 |
| JP | 409275821 A | * | 10/1997 | ........... A01G/13/02 |
| JP | 411018588 A | * | 1/1999 | ........... A01G/13/02 |
| JP | 11098926 A | * | 4/1999 | ........... A01G/13/02 |
| JP | 2000108495 | * | 4/2000 | ........... A01G/13/02 |
| JP | 2001061357 A | * | 3/2001 | ............ A01G/9/22 |
| WO | WO 94/22288 | * | 10/1994 | ........... A01G/09/22 |
| WO | WO 98/28966 | | 7/1998 | |

OTHER PUBLICATIONS

Matteson et al, "Response to Color by Male and Female *Frankliniella occidentalis* during Swarming and Non–Swarming Behavior", *Entomologia Experimentalis et Applicata*, 63:187–201, 1992.

Matteson et al, "Spectral Efficiency of the Western Flower Thrips, *Frankliniella occidentalis*", *J. Insect Physiol.*, 38(6):453–459, 1992.

Vernon et al, "Spectral Responsiveness of *Frankliniella occidentalis* (Thysanoptera: Thripidae) Determined by bTrap Catches in Greenhouses", *Environ. Entomol.*, 19(5):1229–1241, 1990.

* cited by examiner

Primary Examiner—Son T Nguyen
(74) Attorney, Agent, or Firm—G.E. Ehrlich (1995) Ltd.

(57) ABSTRACT

A barrier for protecting plants and crops from insects comprising a screen that reflects ultraviolet light toward the insects such that they are repelled from the screen. Also shown is an enclosure and a method for protecting plants and crops from insects including the reflecting screen.

34 Claims, 2 Drawing Sheets

BARRIER, ENCLOSURE AND METHOD FOR PROTECTING CROPS INCLUDING A LIGHT REFLECTING SCREEN

This application claims the benefit of priority from U.S. Provisional Patent Application No. 60/398,130, filed Jul. 25, 2002.

FIELD AND BACKGROUND OF THE INVENTION

The present invention relates generally to the field of agriculture and horticulture and, more particularly, to a barrier, enclosure and method designed to protect plants and crops from infestation by insects, particularly *Thysanoptera thripidae*, also known as thrips.

Thrips are distributed worldwide and are important crop pests and vectors of viral diseases. Damage to commercial crops from thrips is estimated worldwide in the tens of millions of dollars per year.

The word Thysanoptera comes from the Greek 'thysanos', meaning a fringe, and 'pteron', meaning a wing. Accordingly, thrips are highly mobile fringe-winged insects. There are presently at least 6,000 active species of thrips in the world.

Thrips are very small, elongate, cylindrical, gregarious insects ranging from $\frac{1}{25}$ to $\frac{1}{8}$ inch in length. Males are usually smaller than females. The nymphs are frequently pale yellow and highly active. The antennae and legs are relatively short. Adults are usually black or yellow-brown, but may have red, black or white markings and often jump when disturbed. They may have wings or may be wingless. If wings are present, they are long, narrow and fringed with hairs. Winged varieties often ride air currents in order to disperse widely, having a predisposition towards thunder storms as a suitable time of flight. Hence, they are referred to as 'Thunder flies' or 'Thunder Bugs' in some locations.

Thrips have asymmetrical mouthparts, having only one (the left) mandible, short 6 to 10 segmented antennae and no cerci. Their wings when present are nearly equal, very thin with little venation and a lot of hairs making a fringe around the edge which greatly increase the effective size of the wings. Fully winged, brachypterous (with reduced wings) and apterous (wingless) forms may occur in the same species.

Thrips mouthparts are designed for piercing and sucking. Most species feed on plant sap. To obtain sap, a thrips will make an incision in a single cell with the left mandible and then insert the maxillae and hypo pharynx and pump out the juices of this and adjacent cells using a pharyngeal pump.

Thrips breeding inflicts further damage on plants. Females of some suborders are equipped with ovipositors which are used to cut slits into plant tissue into which eggs are inserted. Females of other suborders lack ovipositors and lay their eggs on the outside of plants, either singly or in small groups.

Thrips undergo gradual metamorphosis. A typical thrips life cycle is as follows. Each female lays 25 to 50 eggs which hatch in two to seven days into active nymphs. Parthenogenesis (where ova develop and mature into female nymphs without fertilization) occurs in many species. Nymphs resemble adults, but lack wings and are lightly colored. The nymphal stage is followed by two resting stages: the prepupa and pupa. The resting stages can be found either on the host plant or in the soil below the host plant. Under favorable conditions, the developmental period from egg to adult ranges from eleven days to three weeks depending on the species. Hence, a population may increase quite rapidly.

The Onion Thrips and the Western Flower Thrips are the most crop-damaging species in the U.S.A., Europe and the Middle East, both for the damage caused by their eating and reproductive behavior and because they are known vectors of plant diseases, the most important of which for greenhouse crops are impatiens necrotic spot virus and tomato spotted wilt virus. When thrips feed on plants infected with these diseases, they transmit the diseases to other plants in the greenhouse. Once plants are infected, it is too late to do anything except dispose of diseased plants.

Tolerance of thrips on floriculture crops is particularly low, as thrips infestation results in deformation of flowers and leaves. Flower buds often abort in heavy infestations. Thrips feed on both foliage and flowers, as well as young tissues in shoot apexes where the leaves are expanding. By puncturing the plant and withdrawing cell sap, they cause bleached, silvered or deformed leaves and necrotic spots or blotches on flower petals. Eventually the damaged foliage becomes papery, wilts and drops prematurely. In addition, thrips produce large quantities of a varnish-like excrement which collects on leaves, creating an unsightly appearance.

Thrips are one of the most difficult pests to control in greenhouses. They are tiny insects that reproduce rapidly, eat voraciously and can easily and swiftly devastate an entire crop. Accordingly, many different practices are presently in use to prevent or control thrips infestation. Control measures to date include biological measures such as the introduction of predacious insects. For example, adult female predatory mites (Neoseiulus) consume from 1 to 10 young thrips per day and have a 30-day lifespan. Adult pirate bugs (Orius) consume 5–20 thrips (all stages) per day. Orius is the only predator that attacks thrips in tight places like flower buds. Soil-dwelling predacious mites (Hypoaspsis) attack thrips in their pre-pupal and pupal stages when they inhabit the soil or growing medium. *Thripobius semiluteus* is a parasitoid of thrips nymphs.

Also in limited use are cultural controls, such as providing a fallow period in summer by removing all plants and heating the greenhouse until soil temperatures reach 60° F. for three weeks. During this time, thrips eggs will hatch and the nymphs will starve for lack of food. Another cultural control is to remove all flowers and buds, if not crucial to the crop. A further cultural measure is to introduce plants, such as garlic, that repel thrips.

There are many different pesticides in use, including "biorational" pesticides, which are used by growers relying on organic pest management. However, thrips control is difficult with the use of pesticides, as during much of their life cycle thrips exist as eggs, as pupae in the soil, or as extremely mobile adults. Once thrips infest a crop, the adult females begin feeding and laying their eggs. Thrips usually concentrate on rapidly growing tissues such as young leaves, flowers and terminal buds. This affinity for tight places makes thorough coverage with a pesticide difficult.

Agricultural researchers have experimented with other measures to repel thrips by interfering with their visual cues with limited success. Reflectance of visible light was found to repel xanthophyllous thrips from the surface of certain colors, as described in an article by Matteson, N., Terry, L (1992). *Response to color by male and female Frankliniella occidentalis during swarming and non-swarming behavior. Entomol. Exper. App.* 63:187–201. Apparently, thrips are more attracted to some colors than to others. This research does not, however, demonstrate a repellant property of any particular color other than relative to other colors.

The use of UV absorbing materials has been found to be of assistance in repelling crop-damaging insects and is in use in commercial growing of field crops. UV absorbing screens and films are used as roof coverings in conjunction with wall coverings of conventional insect-excluding netting. This phenomenon is discussed extensively in a recent professional publication: Antigenus, Y., Lapidot, M., Hadar, D., Messika, Y, Coen, S. (1998). *Ultraviolet-absorbing screens serve as optical barriers to protect crops from virus and insect pests. J. Econ. Entomol.* 91: 1401–1405. The studies were not conclusive, however, in demonstrating a repellant effect as opposed to a camouflaging property and it is conceded in this publication that such films and combinations of films and nets do not provide totally effective exclusion unless the nets have a mesh size that is sufficiently small to constitute a physical barrier.

Further attempts at visual manipulation include the use of reflective colored mulches around the base of plants. These measures were also shown to reduce thrips infestations and tomato spotted wilt virus incidence in crops, as described in the aforecited articles by Brown & Brown, 1992; Greenoug, 1985; Scott et al., 1989; and Staviski et al., 2000. It is known that thrips congregate on the underside of leaves and petals. Apparently, the reflective mulch provides a light source beneath the plants which disturbs them. However, such light reflective colors have not been used in screens.

Accordingly, in light of the limited success of the measures described above, insect-excluding screens have been the preferred method of fighting thrips infestation. This too, however, has achieved only limited success, and thrips remain a major agricultural pest. In 1995, researchers from North Carolina reported that 27 types of insect screens were evaluated for thrips exclusion. Only 3 brands (FLYBARR®, BUGBED® and NO-THRIPS®) were somewhat effective in preventing the entry of thrips into greenhouses.

In order to exclude thrips, screens must have a fine mesh. Typical thrips screens have mesh in excess of of fifty openings per inch, consistent with the small size of the insect. Such screens have a number of inherent limitations due to their restriction of air flow, including higher static pressure drops, inadequate air exchange, higher energy consumption by ventilation fans, excessive wear on fan motors, and higher greenhouse temperatures. Therefore, agriculturalists have been forced to strike a balance between screens with very fine mesh that physically exclude thrips and more open screens that permit needed airflow, but also permit limited entry of thrips and other insects.

As a result, many different screens have been tried, none of which provide a totally satisfactory solution to thrips infestation. U.S. Pat. Nos. 5,007,196 and 6,341,444 disclose electrically charged screens for insect exclusion, the former disposed at the base of a structure to repel crawling insects and the latter as window screens to repel flying insects. Such screens are not practical for the extensive coverage needed by large greenhouses in use in commercial agricultural and horticultural applications. International Patent Application Publication No. WO 98/28966 shows a net made of a transparent or translucent polymeric material in which there is incorporated a substance which absorbs UV light. It was found that nets which incorporate such a substance provide a more effective exclusion than nets without such a substance, presumably because of an optical quality that interferes with the vision of the insects. This is not proven and remains a presumption. A further variation of an insect excluding net is ALUMINET™, produced by Polysack Plastic Industries, Ltd. of Israel, which incorporates a thin aluminum strand periodically within the weave of the net, also presumably for an optical effect.

Additional information concerning thrips control can be found in the following publications, which are incorporated herein by reference:

Anonymous. (1988). *Ad Hoc Panel on control of Frankliniella occidentalis. European and Mediterranean Plant Protection Organization,* Mimeograph. 34 pp.

Berlinger, M. J, Dahan, R., (1989). *In:* (R. Cavalloro C. Pelerents (Eds.) Integrated Pest Management In Protected Vegetable Crops. Proc. CEC/IOBC group meeting/ Cabrils, May 27–29, 1987.A. A Balkema/Rotterdam/ Brookfield.

Belinger, M. J, Mordecchi, S., Leeper, A. (1991). *Application of screens to prevent whitefly penetration into greenhouses in Mediterranean Basin. IOBC/WPRS Bull.* XIV. 105–110.

Berlinger, M. J, Lebiush-Mordechi, S., Fridja, D., Mor, N. (1993). *The effect of types of greenhouse screens on the presence of western flower thrips: a preliminary study. Proc. Working Group Integrated Control in Glasshouses* Pacific Grove, Calif., U.S.A. Apr. 25–29, 1993 *IOBC/ WPRS Bull. Vol.* 16: 13–16.

Bomer, B. (1989). Frankliniella, *Early recognition and treatment* Deutscher-Gartenbau 43 (4): 207–211.

Broadbent, A. B., Matteoni, J. A., Allen., W. R., (1990). *Feeding preferences of the western flower thrips, Frankliniella occidentalis (Pergande) (Thysanoptera: Thripidae) and incidence of Tomato Spotted Wilt Virus among cultivars of florits chrysanthemum. Can Ant.* 122:1111–1117.

Brodgaard, H. F., (1989). *Colored sticky traps for Frankliniella occidentalis (Pergande) (thysanoptera: Thripidae) in glasshouses. J. Appl. Entomol.* 107: 136–140.

Brown, S. L., Brown, J. E., (1992). *Effect of plastic mulch color and insecticides on thrips populations and damage to tomatoes. Hort Technology* 2(2):208–211.

Bryan., D. E., Smith, R. F. (1956) *The Frankliniella occidentalis complex in California (Thysanoptera: Thripidae).* University of California Publication in Entomology 10: 359–410.

Chyzik, R., Klein, M., Ben-Dov, Y., Cohen, A. (1993) *Proc.* 1993 *Int. Conf. Thysanoptera,* S. Burlington, Vt., USA.

Greenoug, D. R., (1985). *Aluminum-surfaced mulch and disease resistance: Approaches to the control of tomato spotted wilt virus in solanaceous crops.* MS. Thesis, Louisiana State Univ., Baton Rouge.

Hadar, D, (1997). *The net is cover all over the crops. Hasade* 77:68–69.

Hadar, D., Nestel, D. (1997). *Utilization of Insect-Proof Nets in Israeli Agriculture. Phytoparasitica* 25(2): 148–149.

Horowits, R., Forer, G., Ishaaya, I. (1994). *Managing resistance in B. tabaci In Israel with emphasis on cotton. Pesticides Sci.* 42: 113–112.

Leuprecht, B. (1988). *A new pest under glass. Flower thrips on vegetable crops. Gemuse-Munchen.* 24 (6): 274–277.

Matteson, N., Terry, I. (1992). *Response to color by male and female Frankliniella occidentalis during swarming and non-swarming behavior. Entomol. Exper. App.* 63:187–201.

Matteson, N., Terry, I., Ascoli, C. A., Gilbert, C. (1992). *Spectral efficiency of the western flower thrips, Frankliniella occidentalis. J. Ins. Physiol.* 38(453–459.

Mazza, C. A., Zavala, J., Scopel, A. L., Ballare, C. L. (1999). *Perception of solar UVB radiation by phytophagous insects: Behavioral responses and ecosystem implications Proc. Natl. Acad. Sci. USA* 96(3):980–985.

Mentel, W. P., (1989). *Bibliography of the western flower thrips, Frankliniella occidentalis (Pergande)*

(*Thysanoptera: Thripidae*). *Section Reg. Ouest palearctique/West Palaearctic Reg. Section Bul.* 1989/XII/3: 29–66.

Moffitt, H. R., (1964). *A color preferences of the western flower thrips, Frankliniella occidentalis. J. Econ. Entomol.* 57: 604–605.

Scott, S. J, McLeod, P. J, Montgomery, F. W., Handler, C. A.(1989). *Influence of reflective mulch on incidence of thrips (thysanoptera: Thripidae: Phlaeothripidae) in staked tomatoes. J. Entomol. Sci.* 24(4): 422–427.

Stavisky, J, Funderburk, J, Olson, S., Momol, T. (2000). *UV-Reflective Mulch as an IPM Tactic for Thrips and Tomato Spotted Wilt Virus in Tomato and Pepper in Florida. Nor. Flor. Res. Ed. Cent.* 2(21): 3–4.

VanLenteren, J. C., Wardlow, L. R., (eds). 1989) *Proc. IOBC/WPGR workshop on biological control of pests in ornamentals in greenhouses*, Alsmeer, the Netherlands, Dec. 14–17, 1987. Section Reg. Ouest Paleartique/West Palaeartic Reg. Section Bul. 1989/XLL/3.

Vernon, R. S., Gillespie, D. R. (1990). *Spectral responsiveness of Frankliniella occidentalis (Thysanoptera:Thripidae) determined by trap catches in greenhouses. Envir. Entomol.* 19(5):1229–1241.

Walker, W. F., (1974). *Responses of selected Thlysanoptera to colored surfaced. Envir. Entomol.* 3: 295–304.

Watterson, J. C., (1985). *Tomato diseases, a practical guide for seedsmen, growers, and agricultural advisors*. Petoseed Co., Saticoy, Calif. P. 38.

Yudin, L. S., Mitchell, W. C., Cho, J J (1987). *Color preferences of thrips (Thysanoptera: Thripidae) with reference to aphids (Homoptera: Aphididae) and leaf miners in Hawaiian lettuce farms. J. Econ. Entomol.* 80:51–55.

Therefore, there is a widely recognized need for, and it would be highly advantageous to have, a screen that serves as an effective barrier to protect plants and crops from infestation by insects, particularly small insects such as thrips.

SUMMARY OF THE INVENTION

Accordingly, it is an object of the present invention to provide a simple screen that reflects light in certain wavelengths in order to repel insects, particularly thrips.

It is a further object of the present invention to provide an enclosure that protects plants and crops from infestation by insects, particularly thrips.

It is a yet further object of the present invention to provide a method for protecting plants and crops from infestation by insects, particularly thrips.

According to one aspect of the present invention there is provided a barrier for restricting insect passage therethrough, thrips in particular, the barrier comprising a screen having a plurality of openings therein, the screen being reflective of at least a portion of wavelengths of light impinging thereon, so as to repel the insects from the screen, thereby restricting insect passage through the barrier.

According to another aspect of the present invention there is provided an enclosure for enclosing at least one agricultural crop, the enclosure being at least partially formed of a barrier for restricting insect passage therethrough, thrips in particular, the barrier comprising a screen having a plurality of openings therein, the screen being reflective of at least a portion of wavelengths of light impinging thereon, so as to repel insects from the screen, thereby restricting insect passage through the barrier.

According to another aspect of the present invention there is provided a method for protecting at least one agricultural crop from insects, thrips in particular, the method comprising enclosing the agricultural crop in an enclosure at least partially formed of a barrier for restricting passage of insects therethrough, the barrier comprising a screen having a plurality of openings therein, the screen being reflective of at least a portion of wavelengths of light impinging thereon, so as to repel insects from the screen, thereby restricting insect passage through the barrier.

According to features in the described preferred embodiments the portion of wavelengths is in the ultra-violet light spectrum.

According to features in the described preferred embodiments the portion of wavelengths is between 320 nm and 400 nm.

According to features in the described preferred embodiments the screen is at least partially formed of material that reflects the light.

According to features in the described preferred embodiments the screen comprises an additive that reflects the light.

According to features in the described preferred embodiments the screen is at least partially coated with a coating that reflects the light.

According to features in the described preferred embodiments the barrier forms at least a portion of an enclosure from which the insect is to be restricted.

According to features in the described preferred embodiments the screen has 15–60 openings per inch length.

According to features in the described preferred embodiments the screen has about 50 openings per inch length.

According to features in the described preferred embodiments the screen comprises at least one UV reflective additive selected from the group consisting of low density polyethylene;

$TiO_2$ white pigment;

2-Hydroxy-4-n-octoxybenzophenoneUVA;

Poly[[6-(1,1,3,3-tetramethylbutyl)amino]-s-triazine-2,4-diyl][[2,2,6,6tetramethyl-4-piperidyl)imino]hexmethylene[(2,2,6,6-tetramthyl-4-piperidyl)imino]]; and polymeric HALS.

According to features in the described preferred embodiments the screen comprises threads of aluminum foil.

The present invention successfully addresses the shortcomings of the presently known configurations by providing a barrier, an enclosure and a method that effectively protect plants and crops from infestation by insects, particularly thrips.

BRIEF DESCRIPTION OF THE DRAWINGS

With specific reference now to the drawings in detail, it is stressed that the particulars shown are by way of example and for the purposes of illustrative discussion of the preferred embodiment of the present invention only, and are presented in the cause of providing what is believed to be the most useful and readily understood description of the principles and conceptual aspects of the invention. In this regard, no attempt is made to show structural details of the invention in more detail that is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1A:
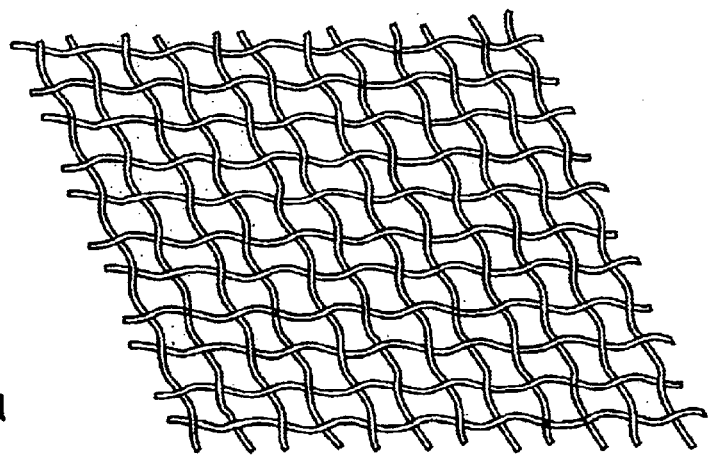
FIGS. 1*a*–1*c* are schematic drawings of different embodiments of screens constructed in accordance with the present invention.

The present invention is of a barrier, an enclosure and a method for protecting plants and crops from insect infestation, particularly thrips.

The principles and operation of the barrier, enclosure and method according to the present invention may be better understood with reference to the drawings and accompanying descriptions.

Before explaining at least one embodiment of the invention in detail, it is to be understood that the invention is not limited in this application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the patent specification, including definitions, will control. In addition, the materials, methods, and examples are illustrative only and not intended to be limiting.

Figure 1B:
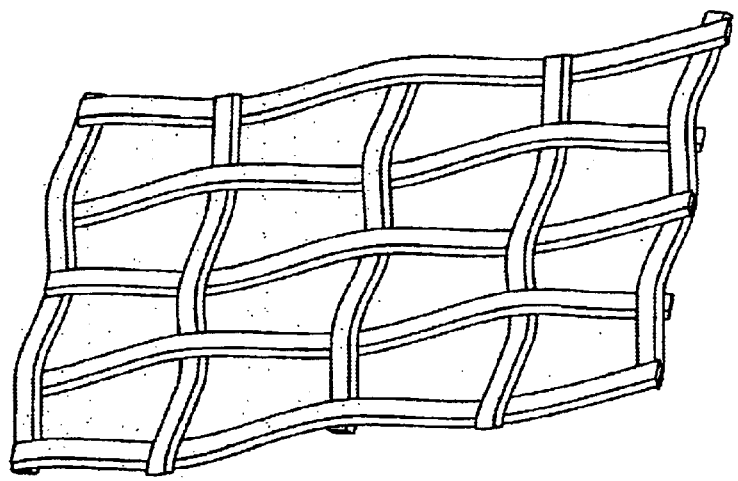
Figure 1C:
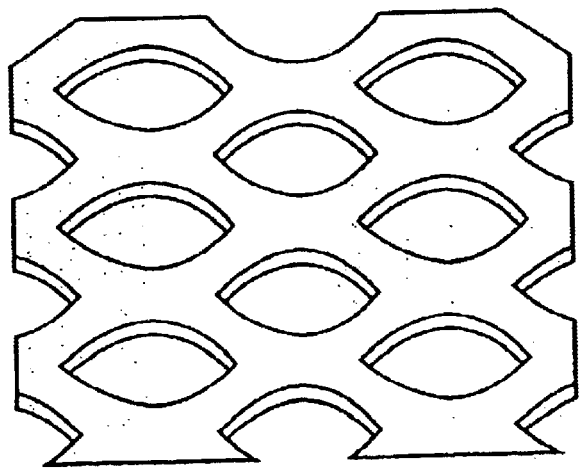

Reference is now made to FIGS. 1a, 1b and 1c, which show representative screens in accordance with the teachings of the present invention, which are collectively referred to hereinbelow as screen 10.

As referred to hereinafter in the specification and claims section below, the word "screen" refers to a framework with multiple openings, holes, spaces, or perforations, designed to allow the passage of air and/or light and or particles therethrough. The screen as described herein is typically, but not limited to, a network made up of wires or threads running in more than one direction to form a mesh configuration, a framework of parallel or crisscrossed bars, or a plate with multiple perforations.

Screen 10 may be any of the rigid or flexible screens well known and commonly in use, such as woven screens produced by weaving transverse threads with a loom; knitted screens produced by knitting with one or more continuous threads, each thread tied around the next, forming a network of knots; bonded screens produced by adhesion, with a layer of threads in one direction placed on top of a layer of threads oriented in the transverse direction, the layers bonded at the points of contact; perforated screens produced by punching holes in a film; expanded screens produced by cutting slits in a sheet and stretching to obtain expanded lath; or extruded screens produced by extruding a sheet between spiked rollers to produce a screen.

FIGS. 1a and 1b are examples of woven screens and FIG. 1c is an example of an expanded screen. It is appreciated that the structure and construction of screen 10 is not a material feature of the invention provided that it has the appropriate dimension of openings and the required light-reflecting properties as hereinafter described.

Similarly, screen 10 may be fabricated of any conventional screening material that has or can be made to have the required light-reflecting properties. Typically, screens are made from metal, including stainless steel and brass; monofilament or film of polymers and plastics, such as polyvinyl, polyethylene, polyester and polypropylene; acrylic yarns; and nylon.

It is appreciated that screen 10 is designed and configured for agricultural applications in which plants and crops are protected from contact with insects, particularly small insects such as thrips. Accordingly, screen 10 may have openings of any shape, and with preferably about 10–70 openings per inch, more preferably about 15–60 openings per inch, and most preferably about 50 openings per inch. As used herein, the term "about" is defined to mean ±15% of the quantity referred to.

It is acknowledged that commonly used agricultural screen has openings of about 0.30 mm (50 mesh, ASTM). However, the size of a thrips is approximately 215 microns at the thorax and 265 microns at the abdomen, so a thrips may pass through such screen. It is a feature of the present invention that such screens with openings in excess of the size of the target insect may be employed due to the repellant effect of the reflected ambient light. Accordingly, the present invention is not limited to screen 10 with any particular size or shape of its openings.

Figure 2:
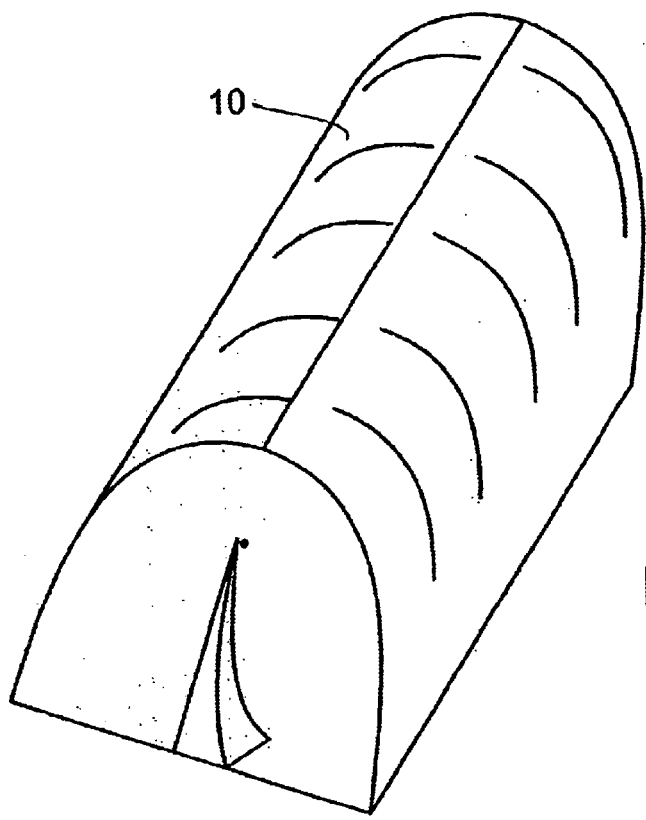
FIG. 2 is a schematic presentation of an enclosure at least partially formed of the screen of FIG. 1.

Reference is now made to FIG. 2. Screen 10 of the present invention is preferably disposed in such an orientation that it provides a barrier between the protected plant and the parasitic insect such that the insect must pass through screen 10 in order to reach the plant. In this respect, screen 10 may be formed into an enclosure, shown in FIG. 2 and hereinafter referred to as enclosure 20. Enclosure 20 is preferably a greenhouse or hothouse or other growing facility in which the plants are exposed to the ambient air. Enclosure 20 may be of any size to house any number of plants desired, ranging from a small dome to cover one flowerpot to a massive greenhouse used in the agriculture and horticulture industries for commercial growing of crops. Moreover, screen 10 may form only a part of the covering of enclosure 20, being used in combination with other appropriate covering materials according to the need.

Screen 10 is designed and configured to reflect ambient light. Ambient light may be produced by solar radiation or by artificial lighting of any type. The origin of the light reflected is not a material element of the present invention provided that it consists of the required wavelengths desired to be reflected.

The research described hereinafter and referred to in the examples given herein has shown ultraviolet light to be particularly effective in repelling thrips. Accordingly, the light to be reflected is preferably light within the ultraviolet spectrum, more preferably with a wavelength ranging between 350 nm and 390 nm.

Although the precise reason for attraction and repulsion has not been determined conclusively, it is presumed that three factors may be involved: First, the reflected light is replicated by the compound eye of the thrips, causing confusion and possibly disorientation; second, the reflected light prevents the thrips from seeing beyond the screen; and third, the light interferes with the thrips ability to discriminate and identify host plants. A detailed description of the testing of thrips reactions to administered light is set forth in detail in Matteson, N., Terry, I., Ascoli, C. A., Gilbert, C. (1992). *Spectral efficiency of the western flower thrips, Frankliniella occidentalis. J. Ins. Physiol.* 38(453–459., which is incorporated herein as if fully set forth.

The reflection of ambient light may be produced by the material of which screen 10 is formed; it may be due to additives added to the material of which screen 10 is formed; or it may be caused by coating screen 10 with a reflective coating.

According to the research conducted, the following exemplary additives included at a rate of up to 5% per volume will increase the UV reflection of a polymeric material, such as polyethylene:

LDPE (Low Density Polyethylene)

$TiO_2$ White Pigment

2-Hydroxy-4-n-octoxybenzophenone UVA

Poly[[6-(1,1,3,3-tetramethylbutyl)amino]-s-triazine-2,4-diyl][[2,2,6,6tetramethyl-4-piperidyl)imino]hexmethylene[(2,2,6,6-tetramthyl-4-piperidyl)imino]]

Polymeric HALS

Moreover, coating screen 10 with UV reflective materials will similarly provide reflectivity of UV light. For example, UV reflecting white and aluminum colored paints are well known. Other reflective materials and substances suitable for coating may be developed in the future. All such present and future coatings may be used for the purpose of providing UV reflectivity to screen 10.

Screen 10 is preferably only partially reflective of the ambient light, depending upon the application. Such partial reflectivity may be produced by only partially forming screen 10 of reflective material or by coating only a portion of screen 10 with reflective material. Partial reflectivity may further be produced by partly covering enclosure 20 with screen 10 in the appropriate proportion and at the appropriate locations of insect entry.

Figure 3:
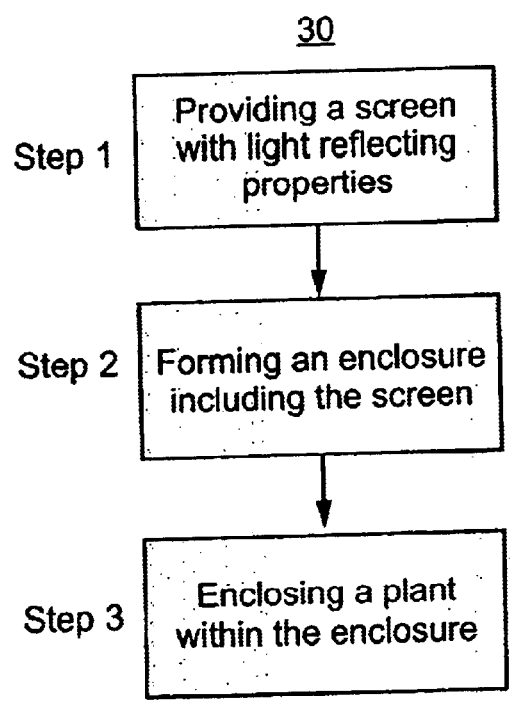
FIG. 3 is a flow chart illustrating the method of the present invention.

Reference is now made to FIG. 3 which is a flow chart illustrating a method, referred to hereinafter as method 30, for protecting plants and crops from insects according to the teachings of the present invention. Method 30 comprises three steps, as follows:

Step 1 comprises providing a screen having the formerly described physical characteristics and light reflecting optical properties.

Step 2 comprises forming an enclosure at least partly covered, preferably totally covered, with the screen.

Step 3 comprises enclosing the plants or crops to be protected within the enclosure.

Method 30 has been shown by the following example to be effective in substantially protecting plants from thrips infestation.

Reference is now made to the following example, which together with the above descriptions, illustrate the invention in a non limiting fashion. Additional objects, advantages, and novel features of the present invention will become apparent to one ordinarily skilled in the art upon examination of the example. Additionally, each of the various embodiments and aspects of the present invention as delineated hereinabove and as claimed in the claims section below finds experimental support in the example.

EXAMPLE

Generally, the nomenclature used herein and the procedures utilized in the present invention include conventionally accepted growing and experimental growing techniques. Such techniques are thoroughly explained in the relevant articles recited in the Background section, all of which are incorporated by reference as if fully set forth herein. The procedures therein are believed to be well known in the art and are provided for the convenience of the reader.

While reducing the present invention to practice, a new screen fabricated of a material with a high level of UV reflection, referred to hereinafter as "BIOTECHNET™ A", was tested. Another version of a screen tested was provided with narrow strips of aluminum foil periodically woven into the screen mesh, referred to hereinafter as "BIOTECHNET™ B". In this exemplary study the inventors evaluated the ability of these screens to protect crops from thrips, as further delineated below.

Materials and Experimental Methods

The screens tested in this study are an original development of BioTechNet Ltd. (Tel Aviv, Israel). As control, the researchers used standard screen made by Jurong Huali sunshading Net Co., Ltd. (China). All screens were woven from polyethylene 0.25 mm monofilament wires with hole size of 50×25 mesh. The monofilament wires used for BIOTECHNET™ A and BIOTECHNET™ B had the following additives (each at 5 weight %) that increase the UV reflection of the resulting polymer:

LDPE (Low Density Polyethylene)

$TiO_2$ White Pigment

2-Hydroxy-4-n-octoxybenzophenone UVA

Poly[[6-(1,1,3,3-tetramethylbutyl)amino]-s-triazine-2,4-diyl][[2,2,6,6tetramethyl-4-piperidyl)imino]hexmethylene[(2,2,6,6-tetramthyl-4-piperidyl)imino]]

Polymeric HALS

The BIOTECHNET™ B is the same screen as BIOTECHNET™ A but provided with 2 mm strips of aluminum foil woven into it at a distance of 2 cm from each other.

The study was conducted during the spring at the Besor experimental station in southern Israel (31° 16' N, 34° 24' E). Fifteen small sized (6×6×2.7 m) 'walk-in' tunnels were used. The tunnels were arranged in randomized block design with five tunnels covered with BIOTECHNET™ A, BIOTECHNET™ B and the control screen. The tunnels' openings were facing south and they had two overlapping layers of screen. Cucumber plants of the "Mochsan" variety were planted in all tunnels on March 21. Plants were grown according to standard commercial procedure except for the use of insecticides. In order to follow the thrips invasion into the tunnels, inventors prevented thrips establishment by treating the plants with the insecticide carbosulfan (0.2%) on April 28 and May 16. Ten leaves were randomly collected (from the upper third part of the plant) in each tunnel once a week. The number of thrips was determined by shaking the leaves over a white sheet of paper and counting all life stages. Early in the experiment, when plants were small, blue sticky traps were used to monitor the level of thrips. Results were compared for each collection date using Analysis of Variance. Comparisons between the two types of new screens were analyzed using the Student-t test.

Experimental Results

From April to June the number of thrips on the leaves [mainly Thrips tabaci] under the BIOTECHNET™ A and BIOTECHNET™ B was significantly lower (3–5 fold) than under the control screen. Specific numbers of thrips trapped within the enclosures covered by each screen are shown in Table 1 below. It appears conclusively that both the entry and establishment rate of the thrips were lower in the tunnels covered by BIOTECHNET™ A and BIOTECHNET™ B as compared to the tunnels covered with control screens.

TABLE 1

Mean nunber of thrips per 10 cucumber leaves (N = 4).

| Net type | Date of collection* | | | | | | |
|---|---|---|---|---|---|---|---|
| | April 16 | April 24 | May 7 | May 14 | May 21 | May 28 | June 4 |
| BIOTECHNET ™ A | 44 a** | 107 a | 46 a | 138 a | 22 a | 22 a | 13 a |
| BIOTECHNET ™ B | 64 a | 147 b | 60 a | 153 a | 27 a | 87 a | 17 a |
| Standard | 407 b | 376 c | 399 b | 398 b | 183 b | 226 b | 41 b |

*Insecticides against thrips were applied on April 28 and May 16.
**Numbers followed by different letters are significantly different ($P < 0.05$, ANOVA).

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather, the scope of the present invention is defined by the appended claims and includes both combinations and subcombinations of the various features described hereinabove as well as variations and modifications thereof which would occur to persons skilled in the art upon reading the foregoing description. Accordingly, it is intended to embrace all such alternatives, modifications and variations that fall within the spirit and broad scope of the appended claims.

What is claimed is:

1. A barrier for restricting passage of thrips therethrough, the barrier comprising a screen of polymeric material having a plurality of openings therein, said polymeric material forming said screen includes at least one additive selected from the group consisting of
    2-hydroxy-4-n-octoxybenzophenone;
    poly[[6-(1,1,3,3-tetramethylbutyl)amino]-s-triazine-2,4-diyl][[2,2,6,6tetramethyl-4-piperidyl)imino] hexmethylene[(2,2,6,6-tetramethyl-4-piperidyl) imino]]; and
    polymeric hindered amine light stabilizer (HALS), for increasing UV reflection of said polymeric material, and at least part of said polymeric material forming said screen includes TiO$_2$ white pigment for being reflective of ultra-violet light having wavelengths between 320 nm and 400 nm impinging thereon, so as to repel the thrips from said screen, thereby restricting passage of the thrips through the barrier.

2. The barrier of claim 1, wherein said TiO$_2$ white pigment is an additive to said polymeric material forming said screen.

3. The barrier of claim 1, wherein said TiO$_2$ white pigment is part of a coating of said polymeric material forming said screen.

4. The barrier of claim 1, wherein said screen forms at least part of an enclosure from which the thrips are to be restricted.

5. The barrier of claim 1, wherein said screen has 15–60 openings per inch length.

6. The barrier of claim 1, wherein said screen has about 50 openings per inch length.

7. The barrier of claim 1, wherein said screen includes strips of aluminum foil periodically woven into said screen.

8. The barrier of claim 1, wherein said TiO$_2$ white pigment is up to 5% per volume of said polymeric material forming said screen.

9. The barrier of claim 1, wherein a said additive is up to 5% per volume of said polymeric material forming said screen.

10. The barrier of claim 1, wherein said polymeric material forming said screen includes all said additives.

11. The barrier of claim 10, wherein each said additive is up to 5% per volume of said polymeric material forming said screen.

12. The barrier of claim 1, wherein said screen completely encloses and protects at least one agricultural crop, such that the thrips must pass through said screen in order to reach said at least one agricultural crop.

13. An enclosure for effectively enclosing and protecting at least one agricultural crop against thrips, the enclosure at least partially comprising a barrier for restricting passage of thrips therethrough, said barrier comprises a screen of polymeric material having a plurality of openings therein, said polymeric material forming said screen includes at least one additive selected from the group consisting of
    2-hydroxy-4-n-octoxybenzophenone;
    poly[[6-(1,1,3,3-tetramethylbutyl)amino]-s-triazine-2,4-diyl][[2,2,6,6tetramethyl-4-piperidyl)imino] hexmethylene[(2,2,6,6-tetramethyl-4-piperidyl) imino]]; and
    polymeric HALS, for increasing UV reflection of said polymeric material, and at least part of said polymeric material forming said screen includes TiO$_2$ white pigment for being reflective of ultra-violet light having wavelengths between 320 nm and 400 nm impinging thereon, so as to repel the thrips from said screen, thereby restricting passage of the thrips through said barrier.

14. The enclosure of claim 13, wherein said screen has 15–60 openings per inch length.

15. The enclosure of claim 13, wherein said screen has about 50 openings per inch length.

16. The enclosure of claim 13, wherein said TiO$_2$ white pigment is an additive to said polymeric material forming said screen.

17. The enclosure of claim 13, wherein said TiO$_2$ white pigment is part of a coating of said polymeric material forming said screen.

18. The enclosure of claim 13, wherein said screen includes strips of aluminum foil periodically woven into said screen.

19. The enclosure of claim 13, wherein said TiO$_2$ white pigment is up to 5% per volume of said polymeric material forming said screen.

20. The enclosure of claim 13, wherein a said additive is up to 5% per volume of said polymeric material forming said screen.

21. The enclosure of claim 13, wherein said polymeric material forming said screen includes all said additives.

22. The enclosure of claim 21, wherein each said additive is up to 5% per volume of said polymeric material forming said screen.

23. The enclosure of claim 13, wherein said screen completely encloses and protects the at least one agricultural crop, such that the thrips must pass through said screen in order to reach the at least one agricultural crop.

24. A method for effectively enclosing and protecting at least one agricultural crop against thrips, the method comprising enclosing the at least one agricultural crop in an enclosure at least partially comprising a barrier for restricting passage of the thrips therethrough, said barrier comprises a screen of polymeric material having a plurality of openings therein, said polymeric material forming said screen includes at least one additive selected from the group consisting of 2-hydroxy-4-n-octoxybenzophenone;

poly[[6-(1,1,3,3-tetramethylbutyl)amino]-s-triazine-2,4-diyl][[2,2,6,6tetramethyl-4-piperidyl)imino]hexmethylene[(2,2,6,6-tetramethyl-4-piperidyl)imino]]; and polymeric HALS, for increasing UV reflection of said polymeric material, and at least part of said polymeric material forming said screen includes $TiO_2$ white pigment for being reflective of ultra-violet light having wavelengths between 320 nm and 400 nm impinging thereon, so as to repel the thrips from said screen, thereby restricting passage of the thrips through said barrier.

25. The method of claim 24, wherein said $TiO_2$ white pigment is an additive to said polymeric material forming said screen.

26. The method of claim 24, wherein said $TiO_2$ white pigment is part of a coating of said polymeric material forming said screen.

27. The method of claim 24, wherein said screen has 15–60 openings per inch length.

28. The method of claim 24, wherein said screen has about 50 openings per inch length.

29. The method of claim 24, wherein said screen includes strips of aluminum foil periodically woven into said screen.

30. The method of claim 24, wherein said $TiO_2$ white pigment is up to 5% per volume of said polymeric material forming said screen.

31. The method of claim 24, wherein a said additive is up to 5% per volume of said polymeric material forming said screen.

32. The method of claim 14, wherein said polymeric material forming said screen includes all said additives.

33. The method of claim 32, wherein each said additive is up to 5% per volume of said polymeric material forming said screen.

34. The method of claim 24, wherein said screen completely encloses and protects the at least one agricultural crop, such that the thrips must pass through said screen in order to reach the at least one agricultural crop.

* * * * *